(12) United States Patent
Cohen

(10) Patent No.: US 9,957,859 B2
(45) Date of Patent: May 1, 2018

(54) MAGNETIC DRAIN PLUG

(71) Applicant: Ronald Cohen, Laguna Niguel, CA (US)

(72) Inventor: Ronald Cohen, Laguna Niguel, CA (US)

(*) Notice: Subject to any disclaimer, the term of this patent is extended or adjusted under 35 U.S.C. 154(b) by 0 days. days.

(21) Appl. No.: 15/444,197

(22) Filed: Feb. 27, 2017

(65) Prior Publication Data

US 2018/0010494 A1 Jan. 11, 2018

Related U.S. Application Data

(60) Provisional application No. 62/360,199, filed on Jul. 8, 2016.

(51) Int. Cl.
*F01M 11/04* (2006.01)
*F01M 11/00* (2006.01)
*F16N 31/00* (2006.01)

(52) U.S. Cl.
CPC ..... *F01M 11/0408* (2013.01); *F01M 11/0004* (2013.01); *B65D 2313/04* (2013.01); *F01M 2011/0416* (2013.01); *F16N 2031/008* (2013.01)

(58) Field of Classification Search
CPC ............ F01M 11/0408; F01M 11/0004; B65D 81/261; F16N 31/002; F16N 31/006
USPC ........ 220/230, 573, 571; 335/305, 302, 296; 184/106
See application file for complete search history.

(56) References Cited

U.S. PATENT DOCUMENTS

| | | | | |
|---|---|---|---|---|
| 1,806,001 A | * | 5/1931 | Simms | ...... B03C 1/28 184/6.25 |
| 2,214,268 A | * | 9/1940 | Brooks | ...... B03C 1/286 138/89 |
| 2,242,830 A | | 5/1941 | Lisle | |
| 2,345,029 A | * | 3/1944 | Brooks | ...... B03C 1/286 210/222 |
| 2,704,156 A | * | 3/1955 | Botstiber | ...... B03C 1/286 210/222 |
| 2,936,890 A | * | 5/1960 | Botstiber | ...... B03C 1/282 210/222 |
| 2,983,385 A | * | 5/1961 | Botstiber | ...... B03C 1/28 137/329.04 |
| 3,283,905 A | * | 11/1966 | Cass | ...... B03C 1/286 184/6.25 |
| 4,752,759 A | * | 6/1988 | Kazuyuki | ...... B03C 1/286 335/302 |
| 4,763,092 A | | 8/1988 | Tomita | |
| 4,810,148 A | | 3/1989 | Aisa et al. | |
| 4,851,116 A | | 7/1989 | Tomita | |
| 5,420,557 A | * | 5/1995 | Chern | ...... B03C 1/286 184/6.25 |
| 5,465,078 A | | 11/1995 | Jones, Jr. | |
| 5,564,526 A | | 10/1996 | Barnard | |
| 5,634,755 A | | 6/1997 | Jones, Jr. | |
| 5,949,317 A | | 9/1999 | Fink et al. | |
| 6,078,238 A | | 6/2000 | Gerold | |

(Continued)

*Primary Examiner* — Robert J Hicks

(57) ABSTRACT

A magnetic drain plug includes a plug body that has a head section and a screw section protruding from the head section. The screw section is includes external threads for threading into a drain hole of a device containing lubricating fluid. The plug body has an axial bore for receiving a removable magnet through the head section. The axial bore has an axial depth such that a bottom of the axial bore extends into the screw section.

20 Claims, 9 Drawing Sheets

(56) References Cited

U.S. PATENT DOCUMENTS

| | | | |
|---|---|---|---|
| 6,111,492 A | 8/2000 | Fink | |
| 7,357,225 B2 | 4/2008 | Dorian | |
| 2008/0019795 A1* | 1/2008 | Denton | F01M 11/0408 411/383 |
| 2008/0135335 A1* | 6/2008 | Lowman | F01M 11/0408 184/1.5 |
| 2011/0197349 A1* | 8/2011 | Lee | F01M 11/0408 4/295 |

* cited by examiner

MAGNETIC DRAIN PLUG

CROSS-REFERENCES TO RELATED APPLICATIONS

This application claims the benefit of U.S. Provisional Patent Application No. 62/360,199, filed on Jul. 8, 2016, the content of which is incorporated by reference in its entirety.

BACKGROUND

Devices, such as internal combustion engines, interconnecting transmissions, and gear boxes have rapidly moving parts that can cause degradation of internal parts over time due to friction. To reduce friction, oil is pumped throughout areas of these devices where there are moving parts. However, since friction still exists, wear of internal parts is inevitable and particles from worn parts will disperse in the device's lubricating oil. These particles can scratch surfaces and as they build up, increase the rate at which internal parts wear. This in turn increases the concentration of particles in a device's lubricating oil, creating a vicious cycle. Thus, the rate of wear increases with use.

This problem is mostly seen in internal combustion engines. To help reduce this problem, internal combustion engines often have an attached oil filter to remove particles from the engine's lubricating oil. However, there can be some problems with oil filters commonly used today. First, oil filters cannot filter all particles from an engine's oil. While the best filters may stop some particles as small as seven microns across, no filter is one hundred percent effective and all filters may allow some quantity of particles as big as 30 microns to pass through. Second, as an oil filter is used, contaminants in an engine's oil will tend to clog it up. This increases the pressure needed to maintain adequate oil flow through the filter. Oil filters have a relief valve that opens up if oil pressure gets too high. When this happens oil filtering is effectively bypassed allowing all contaminants in an engine's oil to wear down engine parts. These are reasons why periodic oil changes are important, and serious problems may arise when people forget or ignore the need to change their engine's oil and filter.

Transmissions may or may not have oil filtering, and gear boxes typically do not have any filtering, leaving all particles dispersed in the lubricating oil to increase wear on the internal parts of these devices.

Therefore, there is a need in the art for improved means of removing particles from lubricating fluid.

SUMMARY OF THE INVENTION

Embodiments of the present invention provide a magnetic drain plug that may include a plug body that has a head section and a screw section protruding from the head section. The screw section includes external threads for threading into a drain hole of a device containing lubricating fluid. The plug body has an axial bore for receiving a removable magnet through the head section. The axial bore has an axial depth such that a bottom of the axial bore extends into the screw section.

These and other embodiments of the invention along with many of its advantages and features are described in more detail in conjunction with the text below and attached figures.

DETAILED DESCRIPTION

Magnetic oil drain plugs are used for removing ferromagnetic particles from a device's lubricating oil by drawing in and capturing the ferromagnetic particles by magnetic force. As the oil drain plug captures ferromagnetic particles, it will not clog up and require a relief valve since oil does not pass through it. As ferromagnetic particles adhere to the oil drain plug, they themselves become magnetized thus aiding in the filtering of more magnetic particles. In addition, nonmagnetic particles can stick to ferromagnetic particles by the process of particle aggregation (heteroaggregation), especially when a device's lubricating oil begins to break down, thus enabling the oil drain plug to filter nonmagnetic particles. Unlike traditional oil filters, the oil drain plug will continue to draw in particles when a device is off. With a device's lubricating oil falling to its lowest position (an oil pan in the case of an internal-combustion engine), harmful particles will have time to migrate toward and adhere to the oil drain plug in a static fluid over long periods of time, thus enabling the oil drain plug to effectively cleanse a device's lubricating oil before the device is put back into service. With its filtering action, the oil drain plug will help remove small particles that oil filters do not completely remove and help remove larger particles that clog up oil filters whether a device is operating or not. This would improve the cleansing action of a device's lubricating oil, which would cause less wear to occur on internal parts regardless of whether or not there is an oil filter. This would also improve efficiency of the lubricated device and especially in the case of internal-combustion engines improve output power and fuel economy since there would be fewer particles clogging up an oil filter, which would otherwise cause an oil pump to use more energy to pump oil through a filter and the rest of the device. In addition, oil filters would have a smaller work load and therefore last for a longer time, thus minimizing damaging effects of prolonged time periods between oil and filter changes.

Figure 1:
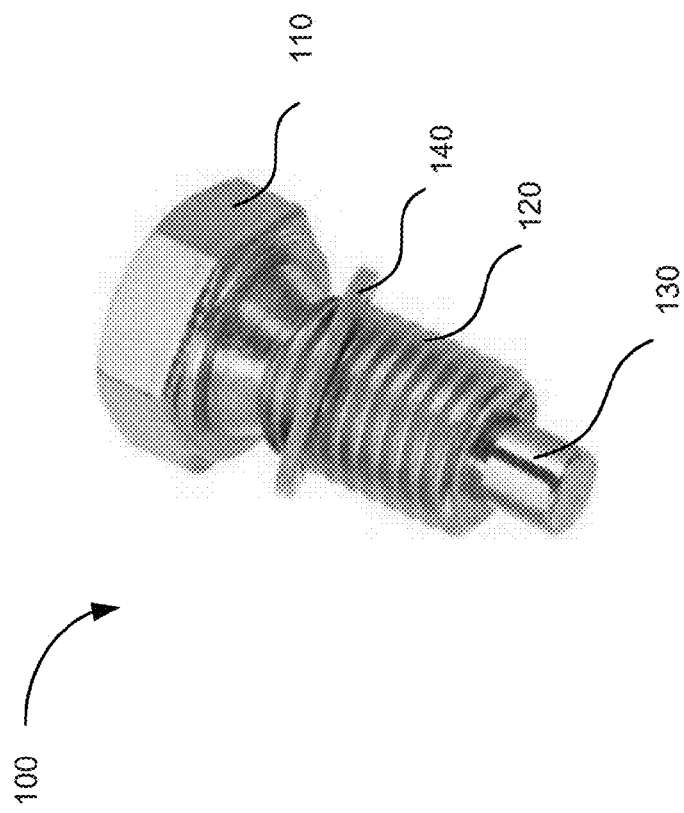
FIG. 1 illustrates a conventional magnetic drain plug.

FIG. 1 illustrates a conventional magnetic oil drain plug 100. Typically, the magnetic oil drain plug 100 includes a plug head 110 and a screw section 120. The screw section 120 has external threads for threading into a drain hole of an oil pan or other devices containing lubricating fluid. The magnetic oil drain plug also includes a permanent magnet 130 attached to the tip of the screw section 120. The magnetic oil drain plug 100 may also include a compression washer 140 for providing a seal when the magnetic oil drain plug 100 is threaded into the drain hole of the oil plan to prevent oil from leaking out.

The conventional magnetic oil drain plug 100 may have several problems. For example, as the plug is installed, its magnet is subjected to the harsh environment inside an engine's oil pan. High heat and increasing acidity of an engine's oil can adversely affect some magnets and their magnetic strength, especially NdFeB magnets that are traditionally used for these types of plugs. Additionally, as ferromagnetic particles in the oil are attracted to the magnet 130, they adhere directly to the magnet 130. This can cause a problem when trying to remove the ferromagnetic particles from the magnet 130 during an oil change, because the magnet could be an extremely powerful rare earth magnet that would hold on to the ferromagnetic particles with a lot of force. Therefore, the ferromagnetic particles may not be easily removed. Furthermore, the magnetic drain plug 100 can be difficult to install. Oil pans are typically made of ferromagnetic materials, such as certain types of steel. Since the magnet 130 could be an extremely strong rare earth magnet, the magnet 130 may be pulled toward the oil pan with a lot of force rather than allowing the magnetic drain plug 100 to be easily centered with the drain hole of the oil pan. This may make it difficult to screw the magnetic oil drain plug 100 into the drain hole of the oil pan.

Embodiments of the present invention provide magnetic drain plugs that addresses these problems.

Figure 2A:
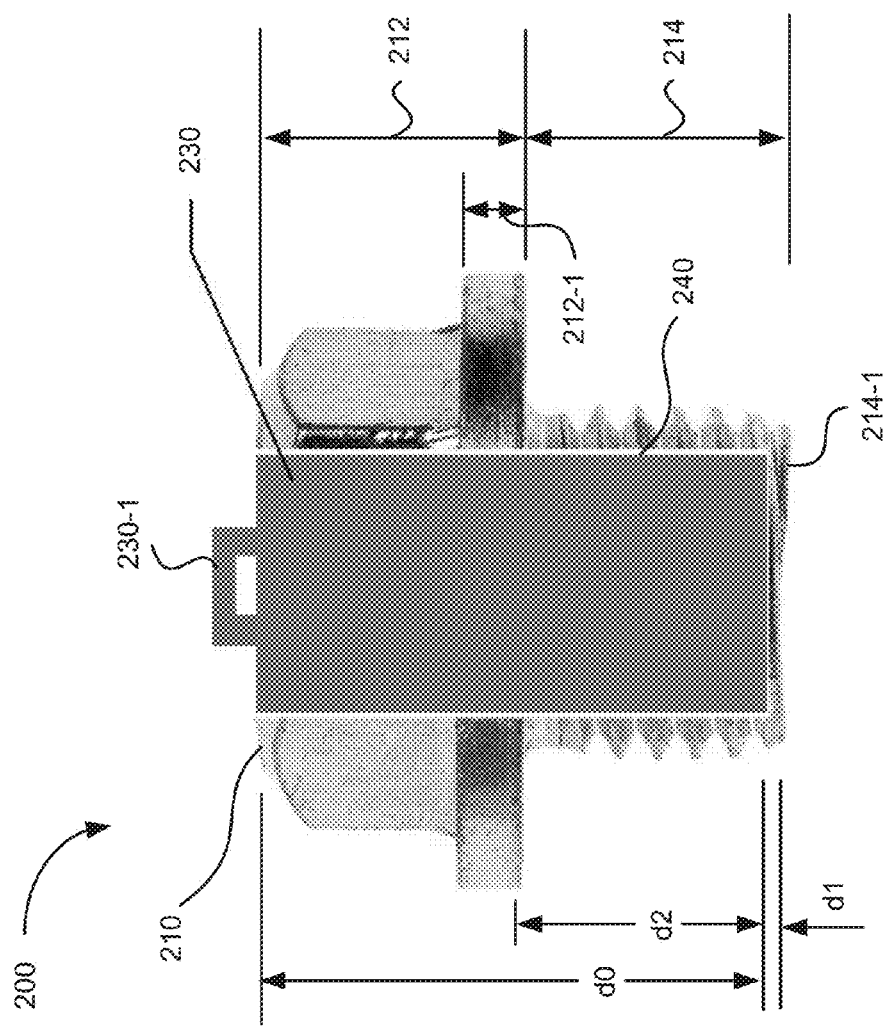
FIG. 2A illustrates schematically a magnetic drain plug according to an embodiment of the present invention.

FIG. 2A is a schematic drawing illustrating a magnetic drain plug 200 according to an embodiment of the present invention. The magnetic drain plug 200 includes a plug body 210, which has a head section 212 and a screw section 214 protruding from the head section 212. The screw section 214 has external threads thereon for threading into a drain hole of an oil pan. In some embodiments, the head section 212 may include a flange 212-1 that may serve as a stop when the magnetic drain plug 200 is threaded into the drain hole of an oil pan. The flange 212-1 may also serve as a sealing surface for a compression washer disposed between the flange 212-1 and an outer surface of the oil pan around the drain hole.

The plug body 210 has a blind axial bore 240 through the head section 212. In one embodiment, the axial bore 240 extends to an axial depth d0 such that the bottom of the axial bore 240 extends into the screw section 214. The magnetic drain plug 200 further includes a magnet 230 that may be removably received by the axial bore 240 of the plug body 210. The various dimensions of the plug body 210 may be determined based on the drain hole dimensions of the oil pan for which the magnetic drain plug 200 is to be used. It should be understood that, although the magnetic drain plug 200 is described as applied to an oil pan, the magnetic drain plug 200 may be applied to any device that may contain lubricating fluid.

The magnetic drain plug 200 may afford several advantages as compared to a conventional magnetic drain plug 100 shown in FIG. 1. For example, because the magnet 230 is not attached to an exterior surface of the plug body 210, it is not exposed to a harsh environment when the magnetic drain plug 200 is installed. Therefore, the ferromagnetic particles in the oil would adhere to the tip 214-1 of the screw section 214 of the plug body 210, instead of adhering directly to the magnet 230. When the magnetic drain plug 200 is removed from the oil pan during an oil change, the magnet 230 may be removed from the plug body 210, rendering the plug body 210 nonmagnetic. This allows ferromagnetic particles adhered to the tip 214-1 of the screw section 214 to fall off from the plug body 210. In addition, the plug body 210 may be threaded into the drain hole of the oil pan before the magnet 230 is installed therein. Since the plug body 210 is nonmagnetic without the magnet 230, the plug body 210 does not exert any magnetic force on a ferromagnetic drain pan, thus allowing easy alignment and installation. The magnet 230 can be installed in the plug body 210 afterward.

Since the magnetic force created by the magnet 230 is inversely proportional to the square of the distance from the magnet 230, it may be advantageous to have the magnet 230 as close to the tip 214-1 of the screw section 214 as possible. In some embodiments, the bottom of the axial bore 240 is at a predetermined distance d1 from the tip 214-1 of the screw section 214. In one embodiment, the predetermined distance d1 is less than one half of the axial length d2 of the screw section 214. In another embodiment, the distance d1 is less than one third of the axial length d2 of the screw section 214. In yet another embodiment, the distance d1 is less than one quarter of the axial length d2 of the screw section 214. In still another embodiment, the distance d1 is less than about 5 mm. In a further embodiment, the distance d1 is less than about 2 mm. In a further embodiment, the distance d1 is about 0.5 mm or less.

In one embodiment, the plug body 210 comprises a ferromagnetic material. As such, the magnet 230 may be held in place by the magnetic force it exerts toward the ferromagnetic plug body 210 when the magnetic drain plug 200 is installed in the oil pan in an inverted orientation. According to an embodiment, the plug body 210 comprises a type of steel, such as nickel-plated carbon steel, zinc-plated carbon steel, chromium-plated carbon steel, magnetic stainless steel, or the like. In some other embodiments, the plug body 210 may comprise a non-ferromagnetic material. For example, the plug body 210 may comprise nonmagnetic stainless steel, aluminum, brass, or other metals and metallic alloys. In some embodiments, the plug body 210 may comprise a ceramic material or a plastic material, such as corrosion-resistant ceramic or plastic materials that can withstand high temperature environments.

Figure 2B:
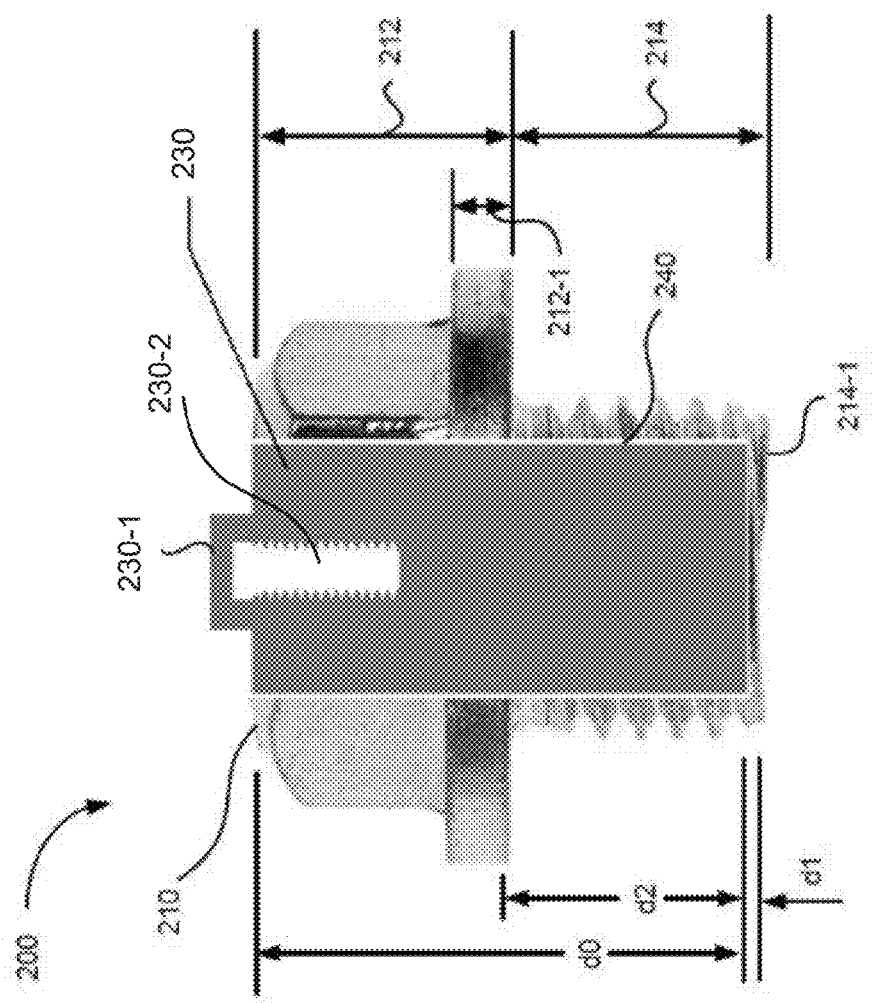
FIG. 2B illustrates schematically a magnetic drain plug according to another embodiment of the present invention.

The magnet 230 may have an axial length that is substantially equal to the axial depth d0 of the axial bore 240 of the plug body 210 according to an embodiment. The magnet 230 may have a handle portion 230-1 that would allow the magnet 230 to be grabbed onto and be pulled out of the axial bore 240 of the plug body 210 when the magnetic drain plug 200 is being cleaned during an oil change, as the magnet 230 could be quite strongly attached to a ferromagnetic plug body 210. In another embodiment, the axial length of the magnet 230 may be greater than the axial depth d0 of the axial bore 240 of the plug body 210, so that it may protrude from the head section 212 of the plug body 210 allowing the magnet 230 to be grabbed onto and be pulled out of the axial bore 240 of the plug body 210. Additionally or alternatively, the magnet 230 may have a threaded hole 230-2 on the top surface thereof, as illustrated in FIG. 2B, so that a screw or a bolt may be screwed into the threaded hole 230-2. The screw or bolt may serve as an anchor when trying to pull the magnet 230 out of the axial bore 240 of the plug body 210.

The magnet 230 may comprise a rare-earth magnet or other types of permanent magnets according to various embodiments. In one embodiment, the magnet 230 comprises NdFeB alloy. In some other embodiments, the magnet 230 may comprise AlNiCo alloy, ferrite, SmCo, and the like. In some embodiments, the magnet 230 may have an epoxy coating, Ni—Cu—Ni plating, tin-zinc alloy plating, nickel plating, or the like In cases where the plug body 210 is not ferromagnetic, the magnetic drain plug 200 may include clips on the head section 212 of the plug body 210 for holding the magnet 230 in place when the magnetic drain plug 200 is installed in the oil pan in an inverted orientation. The magnet 230 can be secured by other means according to other embodiments.

Figure 3:
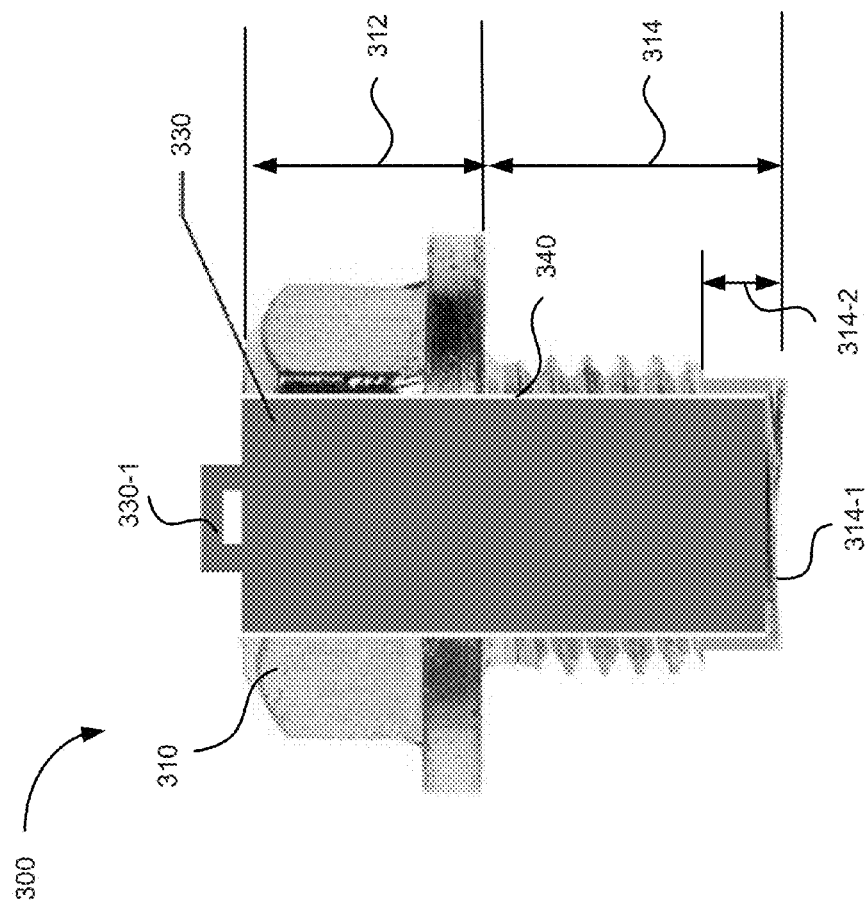
FIG. 3 illustrates schematically a magnetic drain plug according to still another embodiment of the present invention.

FIG. 3 is a schematic drawing illustrating a magnetic drain plug 300 according to still another embodiment of the present invention. The magnetic drain plug 300 is similar to the magnetic drain plug 200. It includes a plug body 310, which has a head section 312 and a screw section 314 protruding from the head section 312. The screw section has external threads thereon for threading into a drain hole of an oil pan. Here, the screw section 314 includes an end section 314-2 near its tip 314-1 that does not have external threads. The end section 314-2 may extend beyond the drain hole of the oil pan when in use, thereby providing an area without threads for the ferromagnetic particles in the oil to adhere to. The plug body 310 has a blind axial bore 340 through the head section 312, for receiving a magnet 330. The magnet 330 may have a handle portion 330-1. Additionally or alternatively, the magnet 330 may have a threaded hole on its top surface, similar to the magnet 230 shown in FIG. 2B.

Figure 4:
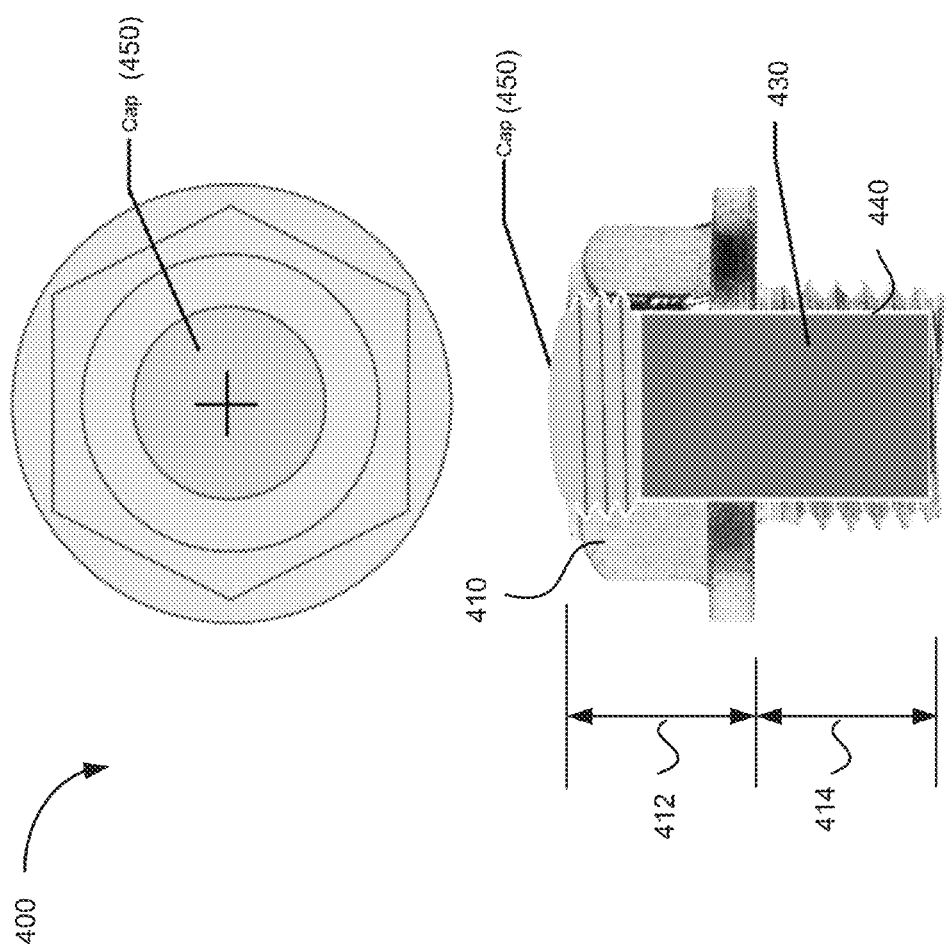
FIG. 4 illustrates schematically a magnetic drain plug according to a further embodiment of the present invention.

FIG. 4 is a schematic drawing illustrating a magnetic drain plug 400 according to a further embodiment of the present invention. Similar to the magnetic drain plug 200, the magnetic drain plug 400 includes a plug body 410 and a magnet 430. The plug body 410 has a head section 412 and a screw section 414. Here, the magnet 430 has an axial length that is shorter than the axial depth of the axial bore 440. The axial bore 440 has internal threads at the top end of the head section 412. The magnetic drain plug 400 further includes a cap 450 that has external threads for threading into the head section 412 of the plug body 310. The cap 450 may keep the magnet 430 in place when the magnetic drain plug 400 is installed in the oil pan in an inverted orientation. The magnet 430 may have a threaded hole on its top surface, similar to the magnet 230 shown in FIG. 2B.

Figures 5A, 5B, 5C:
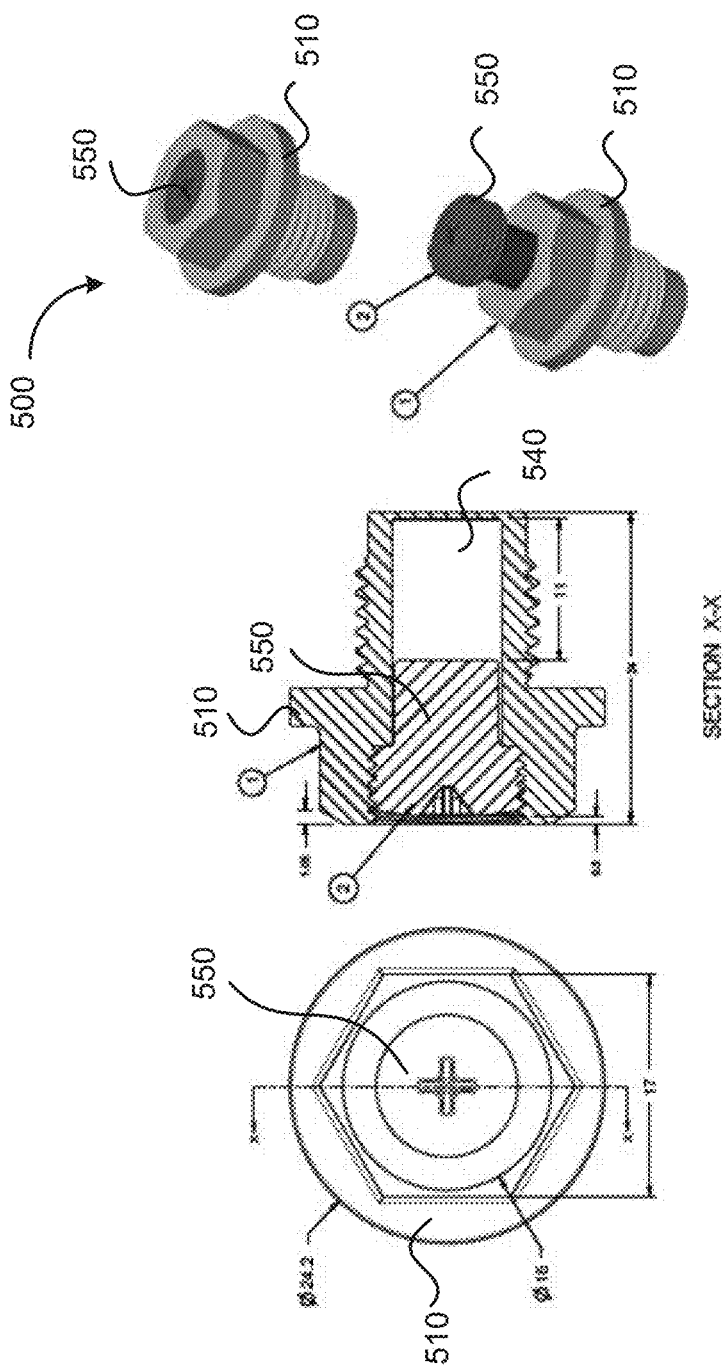
FIGS. 5A-5C show a top view, a cross-sectional view, and perspective views, respectively, of a drain plug including a plug body and a cap according to an embodiment of the present invention.

FIGS. 5A-5C show a top view, a cross-sectional view, and perspective views, respectively, of a drain plug 500 according to an embodiment of the present invention. The drain plug 500 includes a plug body 510 and a cap 550. The cap 550 is configured so that it may be threaded into the plug body 510, as illustrated in FIGS. 5B and 5C and to be described in more detail below.

Figures 6A, 6B, 6C:
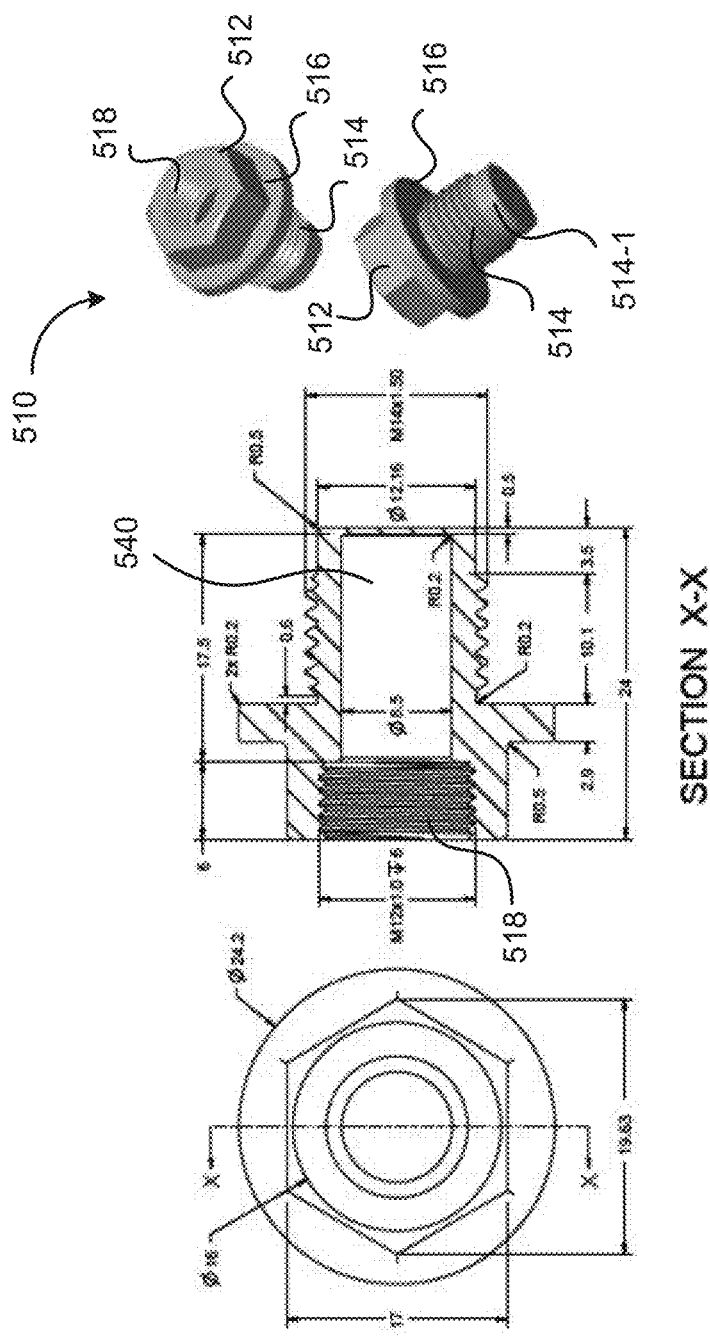
FIGS. 6A-6C show a top view, a cross-sectional view, and perspective views, respectively, of the plug body of the drain plug shown in FIGS. 5A-5C according to an embodiment of the present invention.

FIGS. 6A-6C show a top view, a cross-sectional view, and perspective views, respectively, of the plug body 510 shown in FIGS. 5A-5C according to some embodiments of the present invention. The plug body 510 is similar to the plug body 410 illustrated in FIG. 4. The plug body 510 includes a head section 512 and a screw section 514. In one embodiment, the head section 512 may include an external hex head as illustrated in FIG. 6C. In some other embodiments, the head section 512 may have other shapes, such as circular, square, octagon, a 12-point star (for a splined socket wrench), and the like. In some embodiments, the head section 512 may include a socket designed to fit a socket wrench.

The screw section 514 includes external threads for threading into a drain hole of an oil pan or device. In one embodiment, the screw section 514 includes an end section 514-1 near its tip that does not have external threads. The end section 514-1 may extend beyond the drain hole of the oil pan when in use, thereby providing an area without threads for the ferromagnetic particles in the oil to adhere to.

The plug body 510 may also include a flange 516. The flange 516 can serve as a stop when the plug body 510 is threaded into the drain hole of an oil pan. The flange 516 can also serve as a sealing surface for a compression washer disposed between the flange 516 and an outer surface of the oil pan around the drain hole.

The plug body 510 has a blind axial bore 540 through the head section 512. The axial bore 540 extends to an axial depth such that the bottom of the axial bore 540 extends into the screw section 514. A magnet (not shown) may be removably received by the axial bore 540 of the plug body 510. The head section 512 also includes internal threads 518 for receiving the cap 550, as will be described in more detail below.

Figures 7A, 7B, 7C:
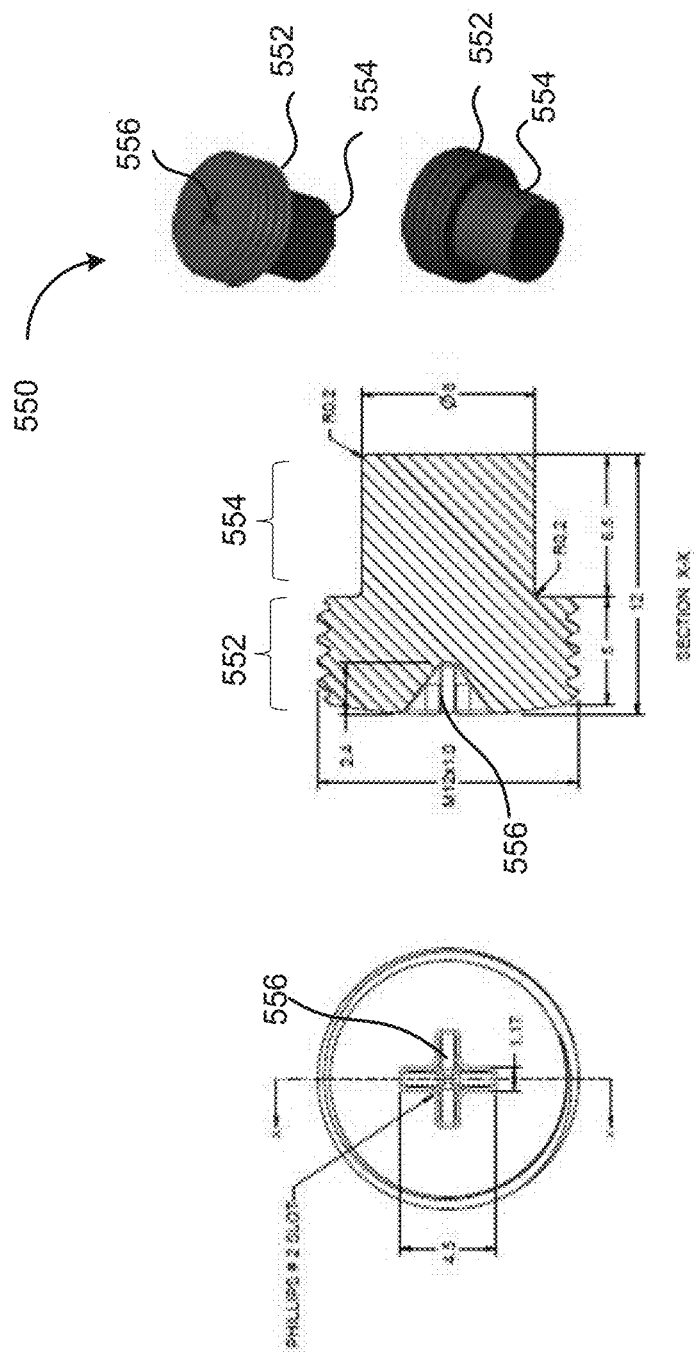
FIGS. 7A-7C show a top view, a cross-sectional view, and perspective views, respectively, of the cap of the drain plug shown in FIGS. 5A-5C according to an embodiment of the present invention.

FIGS. 7A-7C show a top view, a cross-sectional view, and perspective views, respectively, of the cap 550 shown in FIGS. 5A-5C according to some embodiments of the present invention. The cap 550 includes an upper portion 552 and a lower portion 554. The upper portion 552 includes external threads so that the cap 550 can be threaded into the head section 512 of the plug body 510. The upper portion 552 may also include a Phillips slot 556, so that a Phillips screw driver may be used for threading the cap 550 into or out of the head section 512 of the plug body 510. In other embodiments, the upper portion 552 may include a slot of another type, such as a flat slot, a hexagonal socket (for an Allen wrench), and the like. The lower portion 554 of the cap 550 has a diameter that is smaller than the diameter of the axial bore 540 of the plug body 510, so that the lower portion 554 may extend into the axial bore 540, as illustrated in the cross-sectional view of FIG. 5B. The length of the lower portion 554 may be selected such that, when fully threaded into the plug body 510, the cap 550 secures a magnet (not shown) inside the axial bore 540.

It should be noted that, although some exemplary dimensions are shown in FIGS. 5A-5B, 6A-6B, and 7A-7B, different dimensions may be used according to various embodiments of the present invention.

In some embodiments, the plug body 510 and the cap 550 may comprise stainless steel. In some other embodiments, the plug body 510 and the cap 550 may comprise steel such as low-carbon steel, or other metals and metallic alloys.

Figure 8C:
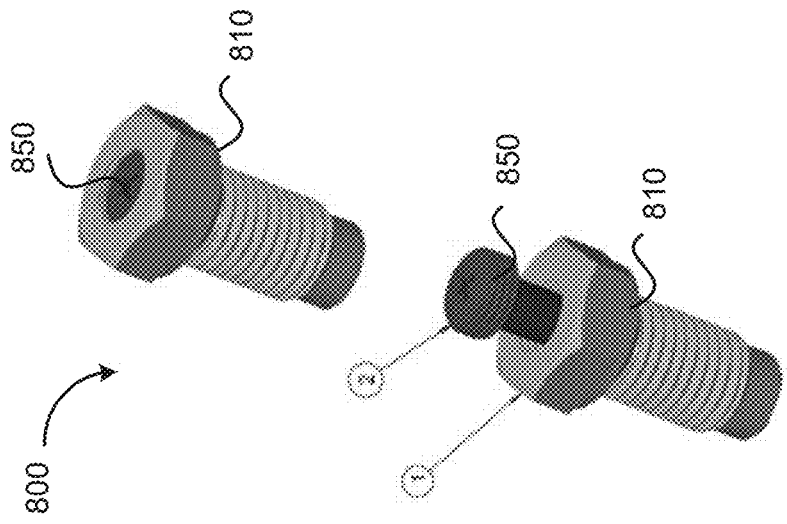
FIGS. 8A-8C show a top view, a cross-sectional view, and perspective views, respectively, of a drain plug including a plug body and a cap according to another embodiment of the present invention.
Figure 8B:
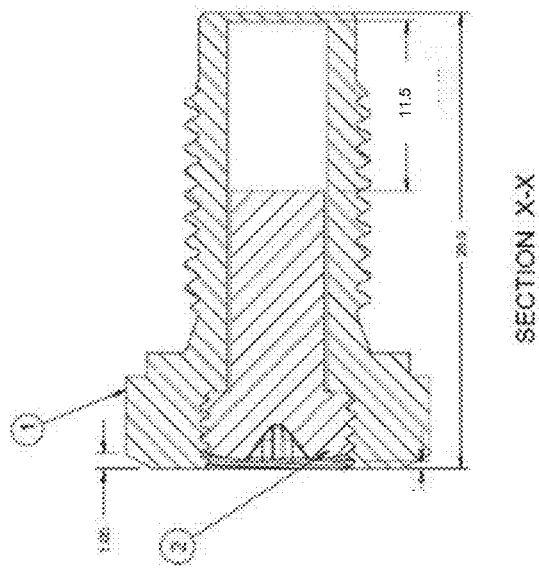
Figure 8A:
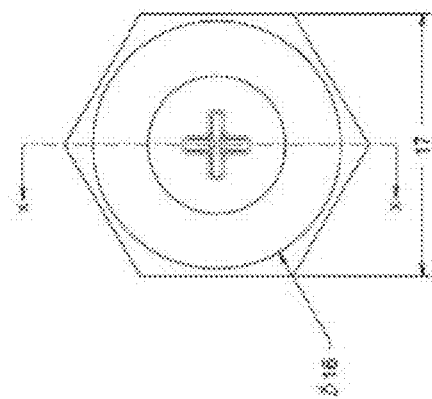

FIGS. 8A-8C show a top view, a cross-sectional view, and perspective views, respectively, of a drain plug 800 according to another embodiment of the present invention. The drain plug 800 includes a plug body 810 and a cap 850, similar to the drain plug 500 illustrated in FIGS. 5A-5C. The plug body 810 is similar to the plug body 510 illustrated in FIG. 6A-6C, except that it does not include a flange. The cap 850 is configured so that it may be threaded into the plug body 810. It should be noted that, although some exemplary dimensions are shown in FIGS. 8A-8B, different dimensions may be used according to various embodiments of the present invention.

As described above, embodiments of the present invention provide magnetic drain plugs in which a magnet is shielded by a plug body and is not exposed to the oil in the drain pan, thereby preventing ferromagnetic particles in the oil from adhering directly to the magnet. The magnet may be removed during cleaning rendering the plug body nonmagnetic, thus allowing the ferromagnetic particles to fall off from the tip of the plug body. Further, the magnetic drain plugs with removable magnets may allow easy alignment and installation into oil pans. It should be understood that, although the magnetic drain plug is described as applied to an oil pan, the magnetic drain plug may be applied to any devices that may contain lubricating fluid.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A drain plug comprising:
a plug body having a head section and a screw section protruding from the head section, the screw section including external threads for threading into a drain hole of a device containing lubricating fluid, the plug body having a blind axial bore for receiving a removable magnet through the head section, the axial bore having an axial depth such that a bottom of the axial bore is at a predetermined distance from a tip of the screw section and the axial bore is not in fluid communication with the lubricating fluid when the plug body is threaded into the drain hole of the device.

2. The drain plug of claim 1, wherein the predetermined distance is less than one half of an axial length of the screw section.

3. The drain plug of claim 1, wherein the predetermined distance is less than 5 mm.

4. The drain plug of claim 3, wherein the predetermined distance is about 0.5 mm or less.

5. A magnetic drain plug for an automotive oil pan, the magnetic drain plug comprising:
a plug body having a head section and a screw section protruding from the head section, the screw section including external threads for threading into a drain hole of the automotive oil pan, the plug body having a blind axial bore through the head section and extending to an axial depth such that a bottom of the axial bore is at a predetermined distance from a tip of the screw section and the axial bore is not in fluid communication with lubricating fluid when the plug body is threaded into the drain hole of the automotive oil pan; and
a removable magnet to be received by the axial bore of the plug body through the head section.

6. The magnetic drain plug of claim 5, wherein the predetermined distance is less than one half, less than one third, or less than one quarter of an axial length of the screw section of the plug body.

7. The magnetic drain plug of claim 5, wherein the predetermined distance is less than about 5 mm.

8. The magnetic drain plug of claim 7, wherein the predetermined distance is less than about 2 mm.

9. The magnetic drain plug of claim 5, wherein the plug body comprises a material other than a ferromagnetic material.

10. The magnetic drain plug of claim 5, wherein the plug body comprises a ferromagnetic material.

11. The magnetic drain plug of claim 5, wherein the magnet has a threaded hole at a top surface thereof.

12. The magnetic drain plug of claim 5, wherein the screw section of the plug body has external threads that extend to the tip of the screw section.

13. The magnetic drain plug of claim 5, wherein the screw section of the plug body includes an end section near the tip thereof that does not have external threads.

14. A drain plug comprising:
a plug body having a head section and a screw section protruding from the head section, the screw section including external threads for threading into a drain hole of a device containing lubricating fluid, the plug body having a blind axial bore for receiving a removable magnet through the head section, the axial bore having an axial depth such that a bottom of the axial bore is at a predetermined distance from a tip of the screw section and the axial bore is not in fluid communication with the lubricating fluid when the plug body is threaded into the drain hole of the device, the head section including internal threads; and
a cap including external threads for threading into the internal threads of the head section of the plug body.

15. The drain plug of claim 14, wherein the predetermined distance is less than one half of an axial length of the screw section of the plug body.

16. The drain plug of claim 14, wherein the predetermined distance is less than about 5 mm.

17. The drain plug of claim 16, wherein the predetermined distance is about 0.5 mm or less.

18. The drain plug of claim 14, wherein the plug body comprises stainless steel or steel.

19. The drain plug of claim 14, wherein the cap comprises stainless steel or steel.

20. The drain plug of claim 14, wherein the screw section of the plug body includes an end section near the tip thereof that does not have external threads.

* * * * *